United States Patent [19]

Guërin

[11] Patent Number: 5,011,239

[45] Date of Patent: Apr. 30, 1991

[54] DEVICE FOR SUSPENDED STORAGE

[75] Inventor: Georges Guërin, Laplume, France

[73] Assignee: Sogal Industrie Franchise Industrielle Societe Anonyme S.I.F.I.S.A., Laplume, France

[21] Appl. No.: 462,703

[22] Filed: Jan. 9, 1990

[30] Foreign Application Priority Data

Jan. 12, 1989 [FR] France .................. 89 00837

[51] Int. Cl.⁵ ............................................ A47B 67/02
[52] U.S. Cl. ............................................ 312/248; 312/269
[58] Field of Search .................. 312/248, 266, 269

[56] References Cited

U.S. PATENT DOCUMENTS

| 264,748 | 9/1882 | Potts | 312/266 X |
| 876,159 | 1/1908 | Erickson | 12/248 |
| 2,504,479 | 4/1950 | Wilhoite et al. | 312/266 |
| 3,224,827 | 12/1965 | Foster et al. | 312/266 |
| 3,485,544 | 12/1969 | Beckerman | 312/248 |
| 3,794,400 | 2/1974 | Guth | 312/269 |
| 4,275,942 | 6/1981 | Steidl | |
| 4,699,437 | 10/1987 | Genereaux | |

FOREIGN PATENT DOCUMENTS 819138  8/1959  United Kingdom .

Primary Examiner—Joseph Falk
Attorney, Agent, or Firm—Oliff & Berridge

[57] ABSTRACT

The present invention relates to a device for suspended storage.

According to the invention, a storage unit in the opening of a supporting structure comprises an articulated panel in two parts and, the second being linked and articulated on the supporting structure by a suspension system of the quadrilateral four-bar linkage type, of which the first part forms a limb. Storage means are provided on the two parts respectively.

The application of the invention is, in particular, for the overhead fitting out of all domestic premises, for the purpose of storage.

10 Claims, 3 Drawing Sheets

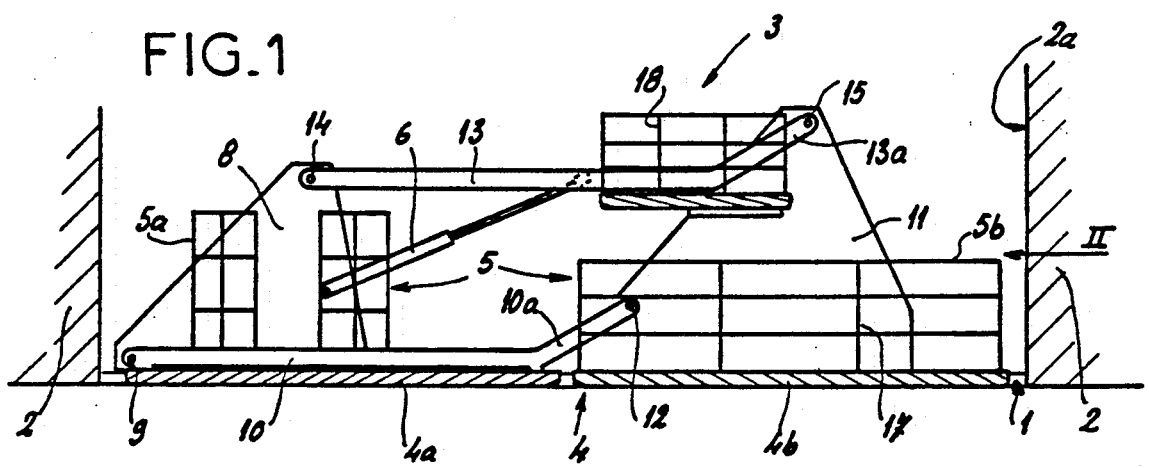
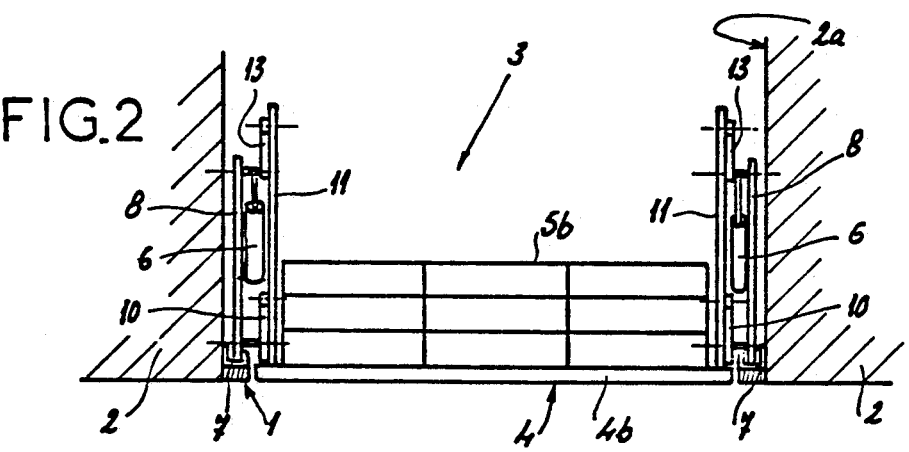
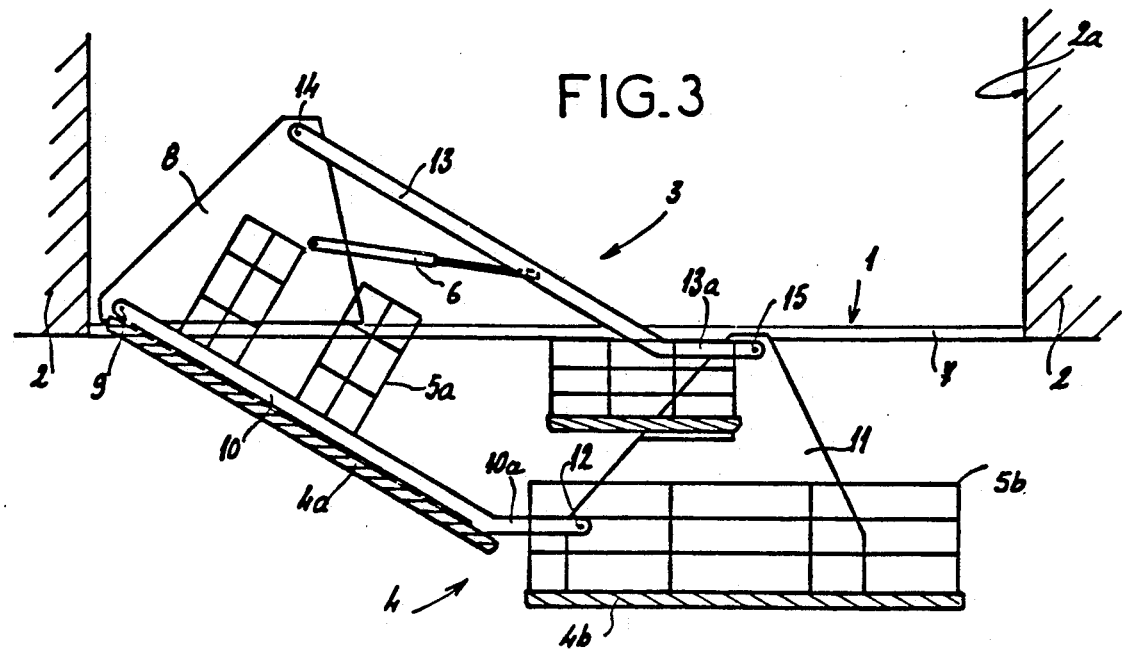

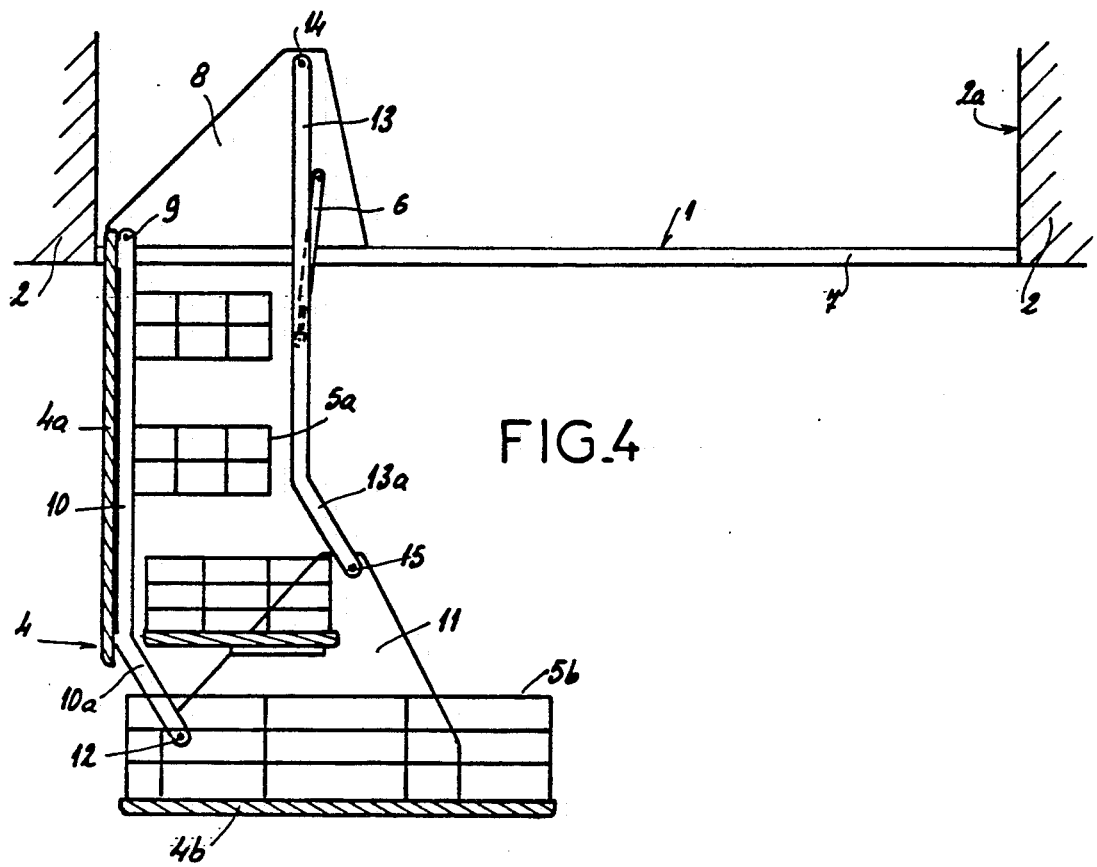
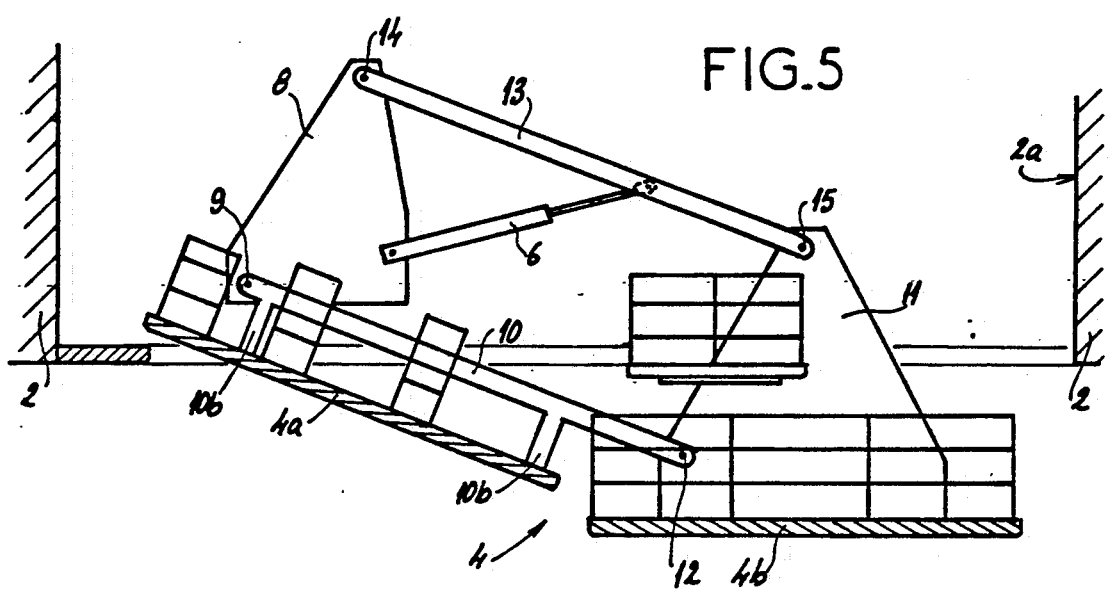

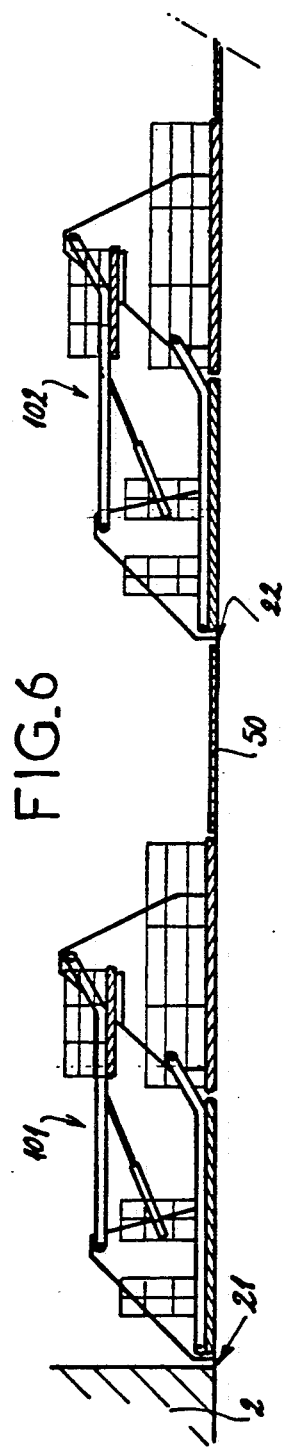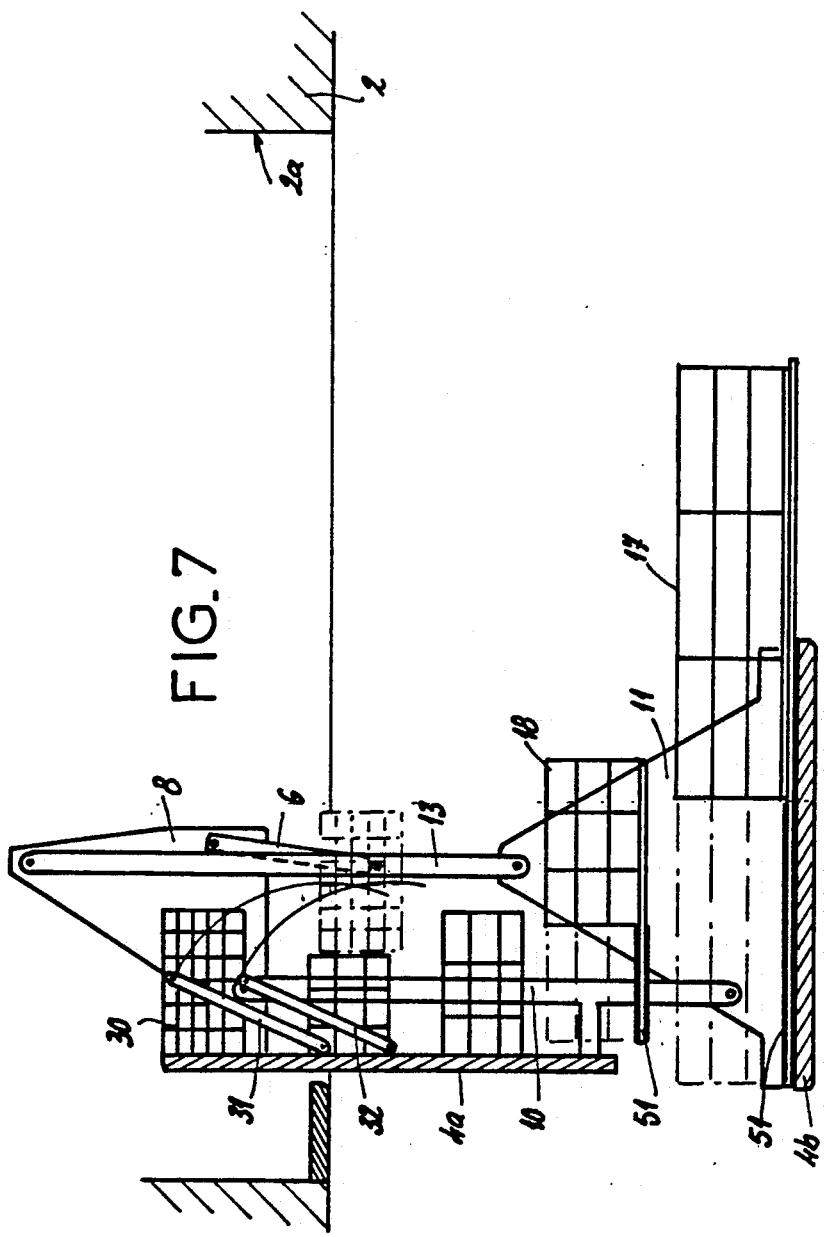

DEVICE FOR SUSPENDED STORAGE

Background of the Invention

The present invention relates to a storage device designed to occupy the upper part of a space, for example of a domestic room, allocated to storage. Description of the prior art Such a device has already been proposed in accordance with the document US-C-4,699,437, said device comprising, on the one hand, a supporting structure of plane and horizontal extension, formed by two parallel beams of a domestic room, delimiting between them an opening or space allocated to storage, and on the other hand a storage unit accommodated in said opening and articulated on the supporting structure, i.e. on the two parallel beams This storage unit can pivot between two positions, namely the closed position, in which the storage unit is integrated into the storage space, i.e. between the two beams, and covers over the opening available between the latter, and an open position, in which the interior of the storage unit is accessible to the user. As regards the storage unit, it comprises a quadrilateral four-bar linkage suspension system formed by two parallel links or suspension members articulated in offset manner on the supporting structure. Each link or suspension member is articulated on one side on the supporting structure, i.e. a beam, about a horizontal axis, and on another, opposite side on a plurality of storage elements consisting of simple boards or shelves, likewise about a horizontal axis.

The functioning of such a storage device is as follows:

in the closed position, the storage unit is retracted into the space allocated to storage, i.e. between the two beams, by being locked on the latter at an end opposite to the articulation on the supporting structure; the shelves are then arranged in a horizontal position between the two beams in the open position, the storage unit is pivoted into a vertical position, in a manner suspended from the supporting structure, i.e. from the two beams; in this position, the shelves remain arranged in a vertical position and are accessible to the user on the inner side.

Such a device permits, in particular, optimum utilization of the top part of any living space, often available but unused in various areas such as corridors, toilets, bathrooms etc . . . This device can be integrated in an appropriate manner, for example by means of suspension members or brackets in the top part of a domestic room, from the ceiling. It can also be added on, starting from a ceiling, and then forms a frieze or a false ceiling. This storage device can comprise a single storage unit or several storage units arranged adjacent or in spaced manner.

Nevertheless, such a device has various disadvantages:

it does not permit the opening allowing access to the storage space to be closed in the sense of a buttjointed closure completely integrated into the supporting structure the surface of the shelves remains individually limited and does not permit cumbersome objects, for example a suitcase or piece of luggage, to be stored on it the weight of the objects stored on the different shelves of the storage unit accelerates the downward opening of the latter into the vertical position, this constituting a danger in certain cases; conversely, the return of the storage unit upwards into the closed position is a difficult operation, indeed impossible if the stowed or stored objects are too heavy. Summary of the invention The present invention aims to remedy all these disadvantages. It is the object of the invention to increase the surface area of at least one storage element while at the same time better integrating the storage unit to which it belongs into the supporting structure, more precisely into the access opening of the latter, and likewise facilitating the manoeuvring of the storage unit, i.e. by making it relatively independent of the weight stored.

According to the present invention, the storage unit comprises a closure panel consisting of at least two parts, which abut in the closed position of the storage unit and together horizontally cover over in said position the access opening in the supporting structure. A first part of the panel forms or is associated with the quadrilateral four-bar linkage on the outer side of the storage unit. A last or second part of the panel, permitting storage on the inner side, forms or is associated with an element of the quadrilateral four-bar linkage facing the opening and articulated on the two suspension links. The inner side of the two parts of the panel is accessible to the user in the open position of the storage unit. In addition, return means for the panel cooperate with the quadrilateral four-bar linkage, on the one hand to return the panel, together with the storage unit, to its closed position and, on the other hand, to brake its downward opening.

According to the present invention, when the closure panel is formed by only two parts, the storage surface of the second part of the panel can then represent half the area of the access opening in the supporting structure; such a surface facilitates or permits the storage of cumbersome objects. Brief description of the drawings The present invention is now described with reference to the drawings, in which:

FIG. 1 represents, in vertical section, a storage device corresponding to a first embodiment of the invention, this device being in the closed position;

FIG. 2 represents a front view in accordance with direction II in FIG. 1 of the device represented in the latter;

FIGS. 3 and 4 represent the device of FIGS. 1 and 2, in intermediate and open positions respectively;

FIG. 5 represents, in vertical section and in an intermediate position, a second embodiment of the invention;

FIG. 6 represents a storage device according to the invention, comprising a plurality of storage units arranged next to one another and aligned in one or several directions;

FIG. 7 represents a storage device identical to that in FIG. 5 but the storage means of which are mobile in position. Description of the preferred embodiments In accordance with FIGS. 1 and 2, a device according to the invention essentially comprises:

a supporting structure 1 of plane and horizontal extension, fixed as illustrated in FIG. 1 in the opening of a parallelepipedic recess 2a in a ceiling 2; this supporting structure itself delimits another opening formed in the horizontal section of the recess 2a;

a storage unit 3 accommodated in the opening of the supporting structure, comprising a panel 4 separated into two distinct parts 4a and 4b, storage means 5 arranged on the inner side of the panel, comprising separate wire compartments 5a and 5b distributed on the first part 4a and the second part 4b respectively;

means 6 consisting of a gas-filled stay or compensating cylinder returning the panel 4 into its closed position and braking the downward opening of said panel.

Along two parallel sides of the recess 2a, respectively, the supporting structure 1 comprises two metallic slide rails 7, each having a U-shaped cross-section and being open towards the top. These two slide rails are fixed in an appropriate manner, for example by means of screws, on the two adjacent sides of the recess 2a. This supporting structure 1 likewise comprises two vertical and parallel side plates 8, each substantially triangular in shape. Each side plate 8 comprises a substantially horizontal side arranged in a firm but adjustable manner inside a corresponding slide rail 7.

In the closed position, and as illustrated in FIG. 1, the two parts 4a and 4b of the panel 4, which abut,.together horizontally cover over the opening 2a in the ceiling 2 and thus the .opening in the supporting structure 1 in the manner of a false ceiling. The form and rectangular dimensions of the two part 4a and 4b are thus adapted to those of the opening 2a in the ceiling 2.

As shown in FIG. 3, each storage unit comprises a quadrilateral four-bar linkage suspension system, consisting, on each side of said unit, of two parallel suspension links 10 and 13, articulated at one end in offset manner on a vertical side plate 8. Each link 10, 13 is articulated on one side of the supporting structure, about a horizontal axis 9, 14 and on another, opposite side on a bracket 11 forming the mobile part of quadrilateral four-bar linkage facing the opening 2a and the fixed part or side plate 8.

The first part 4a of the panel is articulated on the supporting structure 1 and, more precisely, on the two side plates 8, about a horizontal axis materialized by the two aligned pivots 9. To do this, the two parallel lower linking arms 10, which are arranged on either side of the panel 4, are articulated at one end on the two pivots 9 respectively. And the first part 4a of the panel 4 is fixed in contact with the two parallel arms 10.

The second part 4b of the panel 4 is linked to the supporting structure 1, more precisely to the two sides plates 8, by the abovementioned quadrilateral or prismatic four-bar linkage suspension system. This particular system includes the first part 4a of the panel, as described below.

More precisely, this suspension system comprises, in conformity with FIG. 1:

two brackets 11 arranged vertically on either side of the second part 4b, parallel to the two side plates 8 respectively, of triangular shape, and one horizontal side of which is fixed to the second part 4b;

the two lower arms 10 forming, with the first part 4a of the panel 4, a first lower suspension plane; to this end, the two arms 10 each comprise an upward-sloping part 10a and two pivots 12 solid with the two brackets 11 respectively determine a horizontal articulation axis of the second part 4b of the panel 4, at the end of the arms 10 opposite to the articulation axis 9 of the first part 4a;

the two upper arms 13 arranged on either side of the panel 4 and parallel to the two lower arms 10 respectively; each arm 13 is articulated, at one end, on a pivot 14 situated in the vicinity of the apex of a side plate 8 and, at the other end, by means of an upward-sloping part 13a, on an axis 15 situated in the vicinity of the apex of a bracket 11; the two arms 13 thus delimit an upper suspension plane articulated on one side on the supporting structure 1, more precisely on the side plates 8, about a horizontal axis materialized by the aligned pivots 14, and on the other side on the second part 4b of the panel 4, more precisely on the brackets 11, about another horizontal axis materialized by the aligned pivots 15.

The arms 10 and 13, spaced apart in pairs, thus have an identical shape and length.

The storage means 5b associated with the second part 4b of the panel comprises vertically stepped shelves or trays 17 and 18.

The return means consists of two cylinders 6, arranged on each side of the panel 4 and the fixed end of which is articulated on a side plate 8 and the free end of which is articulated on an intermediate point of an arm 13.

The functioning of a device according to the invention is illustrated by FIGS. 1, 3 and 4.

In passing from the closed position (FIG. 1) to the open position (FIG. 4) via an intermediate position (FIG. 3), the first part 4a of the panel 4 on the one hand pivots from a horizontal closed position to a vertical open position and the second part 4b on the other hand descends from the upper level of the supporting structure to a lower level while all the time remaining horizontal. In the open position of FIG. 4, the inside of the panel 4 and thus of the two parts (4a) and (4b) is completely accessible to the user.

The device illustrated in FIG. 5 is distinguished from that described above by the following points:

all the arms 10 and 13 are straight, from one articulation point 9 and 14 to the other 12 and 15 respectively, the lower arms 10 are arranged at a distance from the first part 4a of the panel 4 via perpendicular struts 10b.

In conformity with FIG. 6, the supporting structure 1 has a plurality of openings 21, 22 aligned in at least one direction parallel or orthogonal to the articulation axis of the panels, in this case a single direction orthogonal to the articulation axis 9. And storage units 101, 102, etc. . . . , are arranged in the openings 21, 22, . . . respectively. Between two consecutive openings 21, 22 the supporting structure 1 comprises a fixed horizontal panel 50, providing above it a complementary storage space accessible via either of the said adjacent openings in the open position of the corresponding panel.

The device according to FIG. 7 permits an efficient and optimum use of the upper part of a living space.

A device according to FIG. 7 comprises:

on part 4b, storage means consisting of two baskets 17 and 18 movable horizontally on slide rails 51, on part 4a, a storage compartment 30 capable of swinging downwards into the open position while remaining horizontal by virtue of two parallel arms 31 and 32 articulated, on the one hand, on part 4a of the panel 4 and, on the other hand, on the compartment 30.

The present invention can be the subject of numerous variant embodiments. In particular, the supporting structure can be limited solely to the side plates 8 which can be fixed directly on the walls of the recess 2a in the ceiling 2.

I claim:

1. A storage device comprising:
 a horizontal supporting structure delimiting an opening; and at least one storage unit accommodated in the opening, said at least one storage unit articulated on the supporting structure capable of pivoting between two positions, a closed position in which the storage unit is integrated into a storage space and covers the opening and an open position in which the inside of the storage unit is accessible to the user, each said storage unit further comprising a quadrilateral four-bar linkage suspension system formed by a first and a second elongated parallel suspension link attached on each of opposite sides of the supporting structure, said first and second suspension links on each side of the supporting structure are pivotally attached at one end, said first suspension link above said second suspension link, to be offset and articulated about a horizontal axis, each said first and second suspension link articulated on an opposite end about a horizontal axis where pivotally attached on the storage unit, wherein the storage unit further comprises a closure panel consisting of at least two parts which abut in the closed position to horizontally cover over the opening in the supporting structure and permit storage on an inner side of said parts of said closure panel as defined when in the closed position, a first part of said closure panel associated with said second suspension link of the quadrilateral four-bar linkage pivotally attached on each side of said supporting structure and a second part of said closure panel associated with an element to which the opposite ends of said first and second suspension links are pivotally attached to complete the quadrilateral four-bar linkage, a side of the two parts of the closure panel facing into the opening in the closed position being accessible to the user in the open position, and return means for the closure panel that cooperates with the quadrilateral four-bar linkage to return the closure panel to its closed position and to brake its downward opening.

2. A device as claimed in claim 1, wherein the first part of the closure panel is fixedly attached to said second suspension link on each side of the supporting structure to form a rigid first storage section.

3. A device as claimed in claim 2, wherein the supporting structure further comprises two side plates arranged one on each side of the opening such that on each of said side plates the first and second suspension links of the suspension system are articulated in an offset manner.

4. A device as claimed in claim 3, wherein said element comprises two brackets arranged one on either side of the second part of the closure panel, said first and second suspension links on each side of the suspension system articulated in an offset manner on each bracket.

5. A device as claimed in claim 4, wherein, on either side of the suspension system, the first and second suspension links each comprise, towards the second part of the closure panel, an angled end serving for the articulated attachment to said second part, the second suspension links being in contact to a start of the angled end with the first part of the closure panel.

6. A device as claimed in claim 4, wherein, on either side of the suspension system, the first and second suspension links are straight from the pivotal attachment on the supporting structure to the pivotal attachment on said bracket, the second suspension links being arranged at a distance from and attached to the first part of the closure panel by means of perpendicular struts.

7. A device as claimed in claim 1, wherein the supporting structure has a plurality of openings aligned in at least one direction relative to an "articulation" axis of the panel and a plurality of storage units are respectively arranged in said openings.

8. A device as claimed in claim 1, wherein between two consecutive openings the supporting structure comprises a fixed horizontal panel providing above it a complementary storage space accessible via one of said adjacent openings when the storage unit mounted in the opening is in the open position.

9. A device as claimed in claim 1, wherein a storage means associated with the second part of the closure panel comprises two vertically stepped shelves.

10. A device as claimed in claim 1, wherein a storage means associated with one of the part of the closure panel is movable in its relative position in relation to said panel.

* * * * *